United States Patent
Flor et al.

(10) Patent No.: US 10,585,985 B1
(45) Date of Patent: Mar. 10, 2020

(54) SYSTEMS AND METHODS FOR AUTOMATIC DETECTION OF IDIOMATIC EXPRESSIONS IN WRITTEN RESPONSES

(71) Applicant: Educational Testing Service, Princeton, NJ (US)

(72) Inventors: Michael Flor, Lawrenceville, NJ (US); Beata Beigman Klebanov, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 1 day.

(21) Appl. No.: 15/841,568

(22) Filed: Dec. 14, 2017

Related U.S. Application Data

(60) Provisional application No. 62/433,998, filed on Dec. 14, 2016.

(51) Int. Cl.
   *G10L 15/00* (2013.01)
   *G06F 17/27* (2006.01)
   *G10L 15/22* (2006.01)
   *G06F 16/33* (2019.01)

(52) U.S. Cl.
   CPC ........ *G06F 17/274* (2013.01); *G06F 16/3344* (2019.01); *G06F 17/277* (2013.01); *G10L 15/22* (2013.01)

(58) Field of Classification Search
   CPC ..... G06F 17/27; G06F 17/277; G06F 17/2785
   USPC .......................................................... 704/4
   See application file for complete search history.

(56) References Cited

U.S. PATENT DOCUMENTS

| | | | | |
|---|---|---|---|---|
| 2008/0004862 | A1* | 1/2008 | Barnes | G06F 17/2264 704/4 |
| 2014/0297252 | A1* | 10/2014 | Prasad | G06F 17/289 704/2 |
| 2015/0254565 | A1* | 9/2015 | Beigman Klebanov | G06F 17/2785 706/12 |
| 2019/0005028 | A1* | 1/2019 | Mago | G06F 17/2785 |

OTHER PUBLICATIONS

Cooper, Thomas; Teaching Idioms; Foreign Language Annals, 31(2); pp. 255-266; May 1998.
Littlemore, Jeannette, Trautman Chen, Phyllis, Koester, Almut, Barnden, John; Difficulties in Metaphor Comprehension Faced by International Students Whose First Language is not English; Applied Linguistics, 32(4); pp. 408-429; 2011.
Boers, Frank, Lindstromberg, Seth; Optimizing a Lexical Approach to Instructed Second Language Acquisition; Palgrave MacMillan: New York, NY; 2009.

(Continued)

*Primary Examiner* — Daniel Abebe
(74) *Attorney, Agent, or Firm* — Jones Day

(57) ABSTRACT

Methods and systems for scoring written text based on use of idiomatic expressions, including reading pre-selected idiomatic expressions in a canonical form into memory, expanding idiomatic expressions from the canonical form, reading a written response into the memory, pre-processing the written response, searching the pre-processed written response for idiomatic expressions, and assigning a score to the written response. The score may be based at least in part on the number of idiomatic expressions in the written response. Corresponding apparatuses, systems, and methods are also disclosed.

18 Claims, 12 Drawing Sheets

(56) References Cited

OTHER PUBLICATIONS

Cooper, Thomas; Processing of Idioms by L2 Learners of English; TESOL Quarterly, 33(2); pp. 233-262; Summer 1999.
Laufer, Battia; Avoidance of Idioms in a Second Language: the Effect of L1-L2 Degree of Similarity; Studia Linguistica, 54(2); pp. 186-196; 2000.
Tran, Huong Quynh; Figurative Idiomatic Competence: An Analysis of EFL Learners in Vietnam; Language Education in Asia, 4(1); pp. 23-38; 2013.
Zyzik, Eve; Second Language Idiom Learning: The Effects of Lexical Knowledge and Pedagogical Sequencing; Language Teaching Research, 15(4); pp. 413-433; 2011.
Na Ranong, Sirirat; Idiom Comprehension and Processing: The Case of Thai EFL Learners; Journal of English Studies, 9; pp. 51-97; 2014.
Roberto De Caro, Eliana; The Advantages and Importance of Learning and Using Idioms in English; Cuadernos de Linguistica Hispanica, 14; pp. 121-136; Jul.-Dec. 2009.
Liu, Dilin; The Most Frequently Used Spoken American English Idioms: A Corpus Analysis and Its Implications; TESOL Quarterly, 37(4); pp. 671-700; Winter 2003.
Littlemore, Jeannette; The Use of Metaphor in University Lectures and the Problems that it Causes for Overseas Students; Teaching in Higher Education, 6(3); pp. 333-349; 2001.
Cowie, A.P., Mackin, R., McCraig, I.R.; The Oxford Dictionary of Current Idiomatic English, vol. I-II, General Introduction; Oxford University Press: Oxford, UK; 1984.
Littlemore, Jeannette, Krennmayr, Tina, Turner, James, Turner, Sarah; An Investigation into Metaphor Use at Different Levels of Second Language Writing; Applied Linguistics, 35(2); pp. 117-144; May 2014.
Beigman Klebanov, Beata, Flor, Michael; Argumentation-Relevant Metaphors in Test-Taker Essays; Proceedings of the 1st Workshop on Metaphor in NLP; pp. 11-20; Jun. 2013.
Beigman Klebanov, Beata, Leong, Chee Wee, Heilman, Michael, Flor, Michael; Different Texts, Same Metaphors: Unigrams and Beyond; Proceedings of the 2nd Workshop on Metaphor in NLP; pp. 11-17; Jun. 2014.
Cameron, Lynne; Metaphor in Educational Discourse; Continuum: London, UK; 2003.
Semino, Elena; Metaphor in Discourse; Cambridge University Press: Cambridge, UK; 2008.
Drew, Paul, Holt, Elizabeth; Figures of Speech: Figurative Expressions and the Management of Topic Transition in conversation; Language in Society, 27; pp. 495-522; 1998.
Glucksberg, Sam; Understanding Figurative Language: From Metaphors to Idioms; Oxford Psychology Series, 36; Oxford University Press: Oxford, UK; 2001.
Nunberg, Geoffrey, Sag, Ivan, Wasow, Thomas; Idioms; Language, 70(3); pp. 491-538; Sep. 1994.
Alexander, Richard; Fixed Expressions in English: A Linguistic, Psycholinguistic, Sociolinguistic and Didactic Study; Anglistik und Englischunterricht, 6; pp. 171-188; 1978.
Ernst, Thomas; Grist for the Linguistic Mill: Idioms and 'Extra' Adjectives; Journal of Linguistic Research, 1(3); pp. 61-68; 1980.
Nicolas, Tim; Semantics of Idiom Modification; Ch. 9 in Idioms: Structural and Psychological Perspectives, M. Everaert, et al. (Eds.); Lawrence Erlbaum: Hillsdale, NJ; pp. 233-254;1995.
McClure, Scott; Modification in Non-Combining Idioms; Semantics & Pragmatics, 4(7); pp. 1-7; 2011.
Gibbs, Rayond, Nayak, Nandini; Psycholinguistic Studies on the Syntactic Behavior of Idioms; Cognitive Psychology, 21(1); pp. 100-138; Jan. 1989.
Reddy, Siva, McArthy, Diana, Manandhar, Suresh; An Empirical Study on Compositionality in Compound Nouns; Proceedings of the 5th International Joint Conference on Natural Language Processing; Chiang Mai, Thailand; pp. 210-218; Nov. 2011.

Salehi, Bahar, Cook, Paul, Baldwin, Timothy; Detecting Non-Compositional MWE Components Using Wiktionary; Proceedings of the 2014 Conference on Empirical Methods in Natural Language Processing (EMNLP); Doha, Qatar; pp. 1792-1797; Oct. 2014.
Salehi, Bahar, Cook, Paul; Predicting the Compositionality of Multiword Expressions Using Translations in Multiple Languages; Proceedings of the Second Joint Conference on Lexical and Computational Semantics, vol. I; Atlanta, GA; pp. 266-275; Jun. 2013.
Yazdani, Majid, Farahmand, Meghdad, Henderson, James; Learning Semantic Composition to Detect Non-Compositionality of Multiword Expressions; Proceedings of the 2015 Conference on Empirical Methods in Natural Language Processing; Lisbon, Portugal; pp. 1733-1742; Sep. 2015.
Dale, Robert, Anisimoff, Ilya, Narroway, George; HOO 2012: A Report on the Preposition and Determiner Error Correction Shared Task; Proceedings of the 7th Workshop on the Innovative Use of NLP for Building Educational Applications; pp. 54-62; Jun. 2012.
Blanchard, Daniel, Tetreault, Joel, Higgins, Derrick, Cahill, Aoife, Chodorow, Martin; TOEFL11: A Corpus of Non-Native English; Educational Testing Service, Research Report RR-13-24; Nov. 2013.
Blanchard, Daniel, Tetreault, Joel, Higgins, Derrick, Cahill, Aoife, Chodorow, Martin; ETS Corpus of Non-Native Written English; Catalog No. LDC2014T06, Linguistic Data Consortium; 2014.
Read, Timothy, Cressie, Noel; Goodness-of-Fit Statistics for Discrete Multivariate Data; Springer-Verlag: New York, NY; 1988.
Williams, D.; Improved Likelihood Ratio Tests for Complete Contingency Tables; Biometrika, 63(1); pp. 33-37; Apr. 1976.
Koester, Almut Josepha; The Role of Idioms in Negotiating Workplace Encounters; Ch. 11 in Change and continuity in Applied Linguistics: Selected Papers from the Annual Meeting of the British Association for Applied Linguistics, vol. 15; Sep. 1999.
McCarthy, Michael; Spoken Language and Applied Linguistics; Cambridge University Press: Cambridge, UK; 1999.
Simpson, Rita, Mendis, Dushyanthi; A Corpus-Based Study of Idioms in Academic Speech; TESOL Quarterly, 37(3); pp. 419-441; Autumn 2003.
Entman, Robert; Cascading Activation: Contesting the White House's Frame After Sep. 2011; Political Communication, 20; pp. 415-432; 2003.
Stewart, Dominic; Semantic Prosody: A Critical Evaluation; Routledge: London, UK; 2010.
Partington, Alan; Utterly Content in Each Other's Company: Semantic Prosody and Semantic Preference; International Journal of Corpus Linguistics, 9(1); pp. 131-156; 2004.
Louw, Bill; Irony in the Text or Insincerity in the Writer? The Diagnostic Potential of Semantic Prosodies; Ch. 42 in Text and Technology: In Honour of John Sinclair, M. Baker et al. (Eds.); pp. 157-175; John Benjamins: Philadelphia, PA; 1993.
Sinclair, John; Corpus, Concordance, Collocation; Oxford University Press: New York, NY; 1991.
Gibbs, Raymond, Nayak, Nandini, Cutting, Cooper; How to Kick the Bucket and Not Decompose: Analyzability and Idiom Processing; Journal of Memory and Language, 28(5); pp. 576-593; Oct. 1989.
Gibbs, Raymond, Nayak, Nandini, Bolton, John, Keppel, Melissa; Speakers' Assumptions About the Flexibility of Idioms; Memory and Cognition, 17(1); pp. 58-68; Jan. 1989.
Hamblin, Jennifer, Gibbs, Raymond; Why You Can't Kick the Bucket as You Slowly Die: Verbs in Idiom Comprehension; Journal of Psycholinguistic Research, 28(1); pp. 25-39; Jan. 1999.
McGlone, Matthew, Glucksberg, Sam, Cacciari, Cristina; Semantic Productivity and Idiom Comprehension; Discourse Processes, 17(2); pp. 167-190; 1994.
Minugh, David; The Filling in the Sandwich: Internal Modification of Idioms; In Corpus Linguistics 25 Years on, R. Facchinetti (Ed.); Rodopi: New York, NY; pp. 205-224; 2007.
Moon, Rosamund; Fixed Expressions and Idioms in English: A Corpus-Based Approach; Clarendon Press: Oxford, UK; 1998.

(56) References Cited

OTHER PUBLICATIONS

Bond, Francis, Ho, Jia Qian, Flickinger, Dan; Feeling Our Way to an Analysis of English Possessed Idioms; Proceedings of the 22nd International Conference on Head-Driven Phrase Structure Grammar; Nanyang Technological University (NTU), Singapore; pp. 61-74; 2015.

Muzny, Grace, Zettlemoyer, Luke; Automatic Idiom Identification in Wiktionary; Proceedings of the 2013 Conference on Empirical Methods in Natural Language Processing (EMNLP 2013); Seattle, Washington; pp. 18-21; 2013.

Widdows, Dominic, Dorow, Beate; Automatic Extraction of Idiom Using Graph Analysis and Asymmetric Lexicosyntactic Patterns; ACL2005 Workshop on Deep Lexical Acquisition; Ann Arbor, MI; Jun. 2005.

Gedigian, Matt, Bryant, John, Narayanan, Srini, Ciric, Branimir; Catching Metaphors; Proceedings of the 3rd Workshop on Scalable Natural Language Understanding; pp. 41-48; 2006.

Shutova, Ekaterina, Sun, Lin, Korhonen, Anna; Metaphor Identification Using Verb and Noun Clustering; Proceedings of the 23rd International Conference on Computational Linguistics; pp. 1002-1010; Aug. 2010.

Katz, Graham, Giesbrecht, Eugenie; Automatic Identification of Non-Compositional Multi-Word Expressions Using Latent Semantic Analysis; Proceedings of the Workshop on Multiword Expressions: Identifying and Exploiting Underlying Properties; Sydney, Australia; pp. 12-19; Jul. 2006.

Li, Linlin, Sporleder, Caroline; A Cohesion Graph Based Approach for Unsupervised Recognition of Literal and Non-Literal Use of Multiword Expressions; Proceedings of the 2009 Workshop on Graph-based Methods for Natural Language Processing; Suntec, Singapore; pp. 75-83; Aug. 2009.

Sporleder, Caroline, Li, Linlin; Unsupervised Recognition of Literal and Non-Literal Use of Idiomatic Expressions; Proceedings of the 12th Conference of the European Chapter of the Association for Computational Linguistics; Athens, Greece; pp. 754-762; Apr. 2009.

Fazly Afsaneh, Cook, Paul, Stevenson, Suzanne; Unsupervised Type and Token Identification of Idiomatic Expressions; Computational Linguistics, 35(1); pp. 61-103; 2009.

Peng, Jing, Feldman, Anna, Vylomova, Ekaterina; Classifying Idiomatic and Literal Expressions Using Topic Models and Intensity of Emotions; Proceedings of the 2014 Conference on Empirical Methods in Natural Language Processing (EMNLP); Doha, Qatar; pp. 2019-2027; Oct. 2014.

Fazly, Afsaneh, Stevenson, Suzanne; Automatically Constructing a Lexicon of Verb Phrase Idiomatic Combinations; Proceedings of the 11th Conference of the European Chapter of the Association for Computational Linguistics; Trento, Italy; pp. 337-344; Apr. 2006.

Diab, Mona, Bhutada, Pravin; Verb Noun Construction MWE Token Supervised Classification; Proceedings of the 2009 Workshop on Multiword Expressions; Suntec, Singapore; pp. 17-22; Aug. 2009.

Diab, Mona, Krishna, Madhav; Unsupervised Classification of Verb Noun Multi-Word Expression Tokens; Proceedings of the 10th International Conference on Intelligent Text Processing and Computational Linguistics; pp. 98-110; 2009.

Hashimoto, Kazuma, Tsuruoka, Yoshimasa; Adaptive Joint Learning of Compositional and Non-Compositional Phrase Embeddings; Proceedings of the 54th Annual Meeting of the Association for Computational Linguistics; Berlin, Germany; pp. 205-215; Aug. 2016.

Kiela, Douwe, Clark, Stephen ; Detecting Compositionality of Multi-Word Expressions Using Nearest Neighbours in Vector Space Models; Proceedings of the 2013 Conference on Empirical Methods in Natural Language Processing (EMNLP 2013); Seattle,Washington; pp. 1427-1432; Oct. 2013.

Cordeiro, Silvio, Ramisch, Carlos, Idiart, Marco, Villavicencio, Aline; Predicting the Compositionality of Nominal Compounds: Giving Word Embeddings a Hard Time; Proceedings of the 54th Annual Meeting of the Association for Computational Linguistics; Berlin, Germany; pp. 1986-1997; Aug. 2016.

Ramisch, Carlos, Cordeiro, Silvio, Zilio, Leonardo, Idiart, Marco, Villavicencio, Aline, Wilkens, Rodrigo; How Naked is the Naked Truth?: A Multilingual Lexicon of Nominal Compound Compositionality; Proceedings of the 54th Annual Meeting of the Association for Computational Linguistics; Berlin, Germany; pp. 156-161; Aug. 2016.

* cited by examiner

| Canonical form | Expanded form |
|---|---|
| let the cat out of the bag | {let\|letting\|lets} (the\|a\|an)^ {cat\|cats} cutting out} {outs\|outing\|outed\|out} of (the\|a\|an)^ {bag\|bagged\|bags\|bagging} |
| cramp someone's style | {cramping\|cramp\|cramps\|cramped} {my\|your\|his\|her\|our\|their\|one\|someone's} {style\|styles\|styled\|styling} |
| damned if one does and damned if one doesn't | {damn\|damned\|damns\|damning\|damneds} if {I\|you\|he\|she\|we\|they\|one\|someone\|somebody} {does\|done\|did} and {damn\|damned\|damns\|damning\|damneds} if {I\|you\|he\|she\|we\|they\|one\|someone\|somebody} {doesn't\|don't\|didn't} |

110 — Canonical form
120 — Expanded form

FIG. 1

| Prompt ID | Core statement of the prompt | # Essays in our study |
|---|---|---|
| P1 | It is better to have broad knowledge of many academic subjects than to specialize in one specific subject. | 451 |
| P2 | Young people enjoy life more than older people do. | 507 |
| P3 | Young people nowadays do not give enough time to helping their communities. | 393 |
| P4 | Most advertisements make products seem much better than they really are. | 400 |
| P5 | In twenty years, there will be fewer cars in use than there are today. | 465 |
| P6 | The best way to travel is in a group led by a tour guide. | 235 |
| P7 | It is more important for students to understand ideas and concepts than it is for them to learn facts. | 393 |
| P8 | Successful people try new things and take risks rather than only doing what they already know how to do well. | 441 |

FIG. 2

| Annotation option | Explanation |
|---|---|
| Wrong Expression | choose this option if you think that the system picked up a wrong expression, not the intended one |
| Idiomatic use | choose this option if you think that the sentence indeed contains an instance of the idiom |
| Literal use | choose this option if you think that the expression (words) is correct, but it is used in a literal and not idiomatic sense |
| NeedMoreContextToDecide | choose this option if you feel that you need more context to decide |
| Don't know | use this option sparingly |

For "pay attention":
...researchers should pay their attention on the specific subject...
If the student pays specific attention to...
If Einstein had not paid specific attention to...
...pay particular attention on subjects they are interested in...
But then you can pay your attention in the specific characteristics of movies...

620

For "change one's mind":
At that time, people change their mind...
...you might change your mind...
...can the customer change his mind after...
Advertisements can change consumer's mind about products.
...to change the people's mind...

FIG. 6

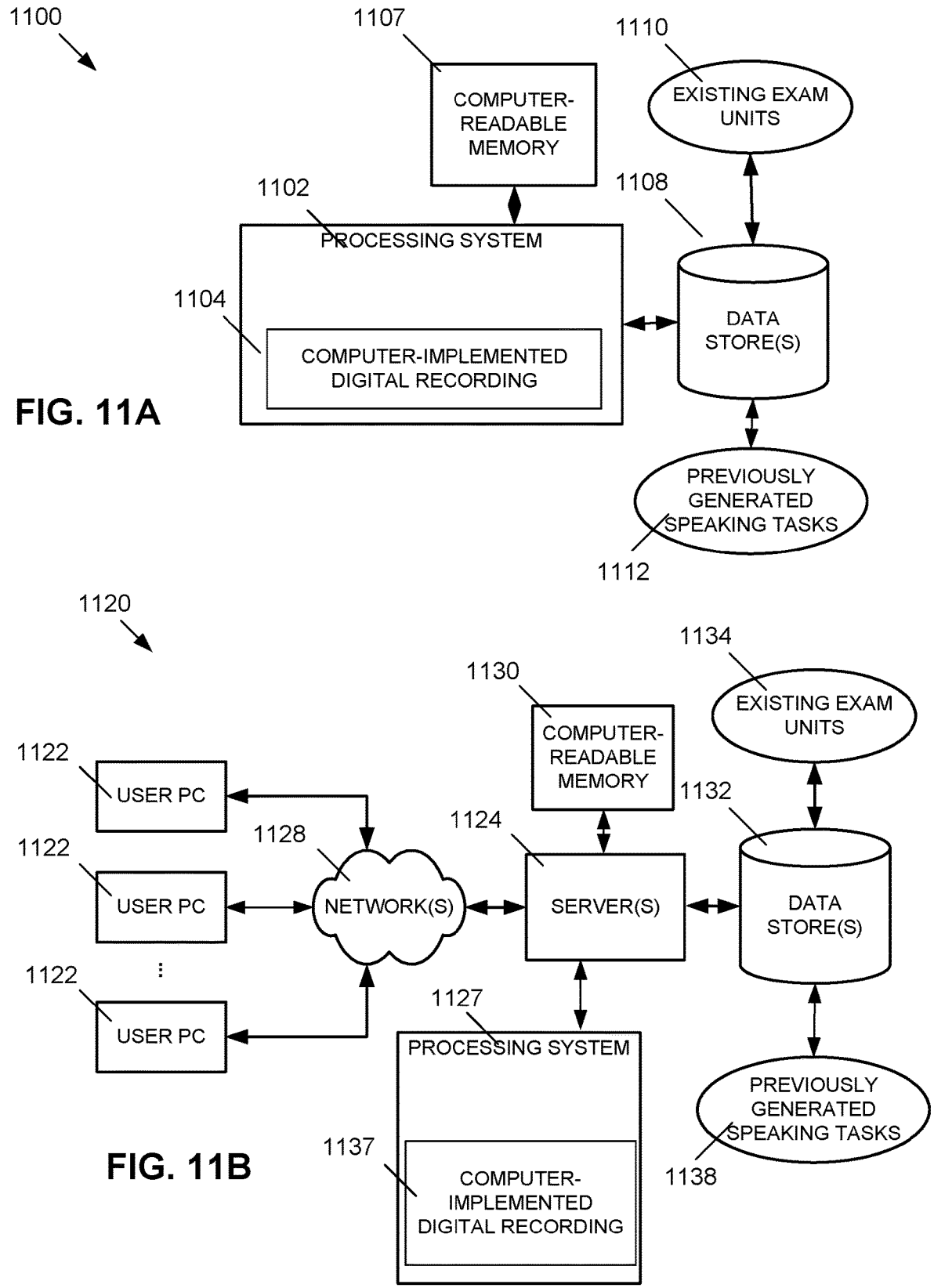

SYSTEMS AND METHODS FOR AUTOMATIC DETECTION OF IDIOMATIC EXPRESSIONS IN WRITTEN RESPONSES

CROSS-REFERENCE TO RELATED APPLICATIONS

This application claims priority to U.S. Provisional Application No. 62/433,998, filed Dec. 14, 2016, the entirety of which is herein incorporated by reference.

TECHNICAL FIELD

The technology described herein relates to automatic analysis of written text, and more specifically to automatic identification of idiomatic expressions in argumentative essays written by non-native speakers of English.

BACKGROUND

An idiom is an expression whose meaning cannot be derived from the usual meaning of its constituents. As such, idioms present a special learning problem for non-native speakers of English, especially learners of English as foreign language (EFL). Understanding of idiomatic expressions can be important, for example, in academic settings, where presentation of ideas often involves figurative language. Even more encompassing is the notion that natural use of idioms can overtly demonstrate participation in a realm of shared cultural knowledge and interests, and so to help a learner gain social acceptance.

A long line of research has focused on EFL students strategies for comprehending idioms. Investigations of the processes of idiom comprehension by non-native English speakers from a variety of backgrounds found that subjects used a variety of strategies for comprehension. Investigations of avoidance of English idioms by EFL university students, using a fill-in translation test, found that lower English proficiency was associated with greater avoidance of English idioms. Investigations of knowledge of 50 idioms collected from the lists of frequently used English idioms found poor idiomatic competence among EFL students in Vietnam. It is known that multiple factors contribute to figurative competency, such as learners' proficiency levels, types of idioms, learners' vocabulary knowledge, similarity of idioms between L2 and L1.

Researchers have also looked at figurative language that EFL learners encounter in their educational environments and materials (e.g. textbooks, lectures, etc.). This line of research is often related to developing teaching and reference materials for language learners. A corpus-based study of the spoken American English idioms used most frequently by college students learning American English involved a close concordance search and analysis of the idioms used in three contemporary transcribed spoken American English corpora, and provided suggestions for improving the development of idiom teaching and reference materials. Investigations of the non-native speakers of English experience when encountering metaphors in British university lectures showed a range of difficulties, including nonunderstanding (failure to interpret an expression) and misunderstanding (getting an incorrect interpretation).

A complementary line of research focuses on the EFL students' use of metaphors and idioms in their linguistics productions. It has been claimed that accurate and appropriate use of idioms is a strong distinguishing mark of the native-like command of the language and might be a reliable measure of the proficiency of foreign learners. Recently, analysis of the use of metaphors in 200 exam essays written by EFL students, at different levels of English proficiency, found that metaphor use increases with proficiency level, and even suggested that descriptors for metaphor use could be integrated in the rating scales for writing. Another recent investigation of the use of metaphors in 116 test-takers argumentative essays found moderate-to-strong correlation between the percentage of metaphorically used words in an essay and the writing quality score. Notably, both recent studies used only a small number of essays and conducted an exhaustive manual analysis of metaphoric expressions.

SUMMARY

Methods and systems for scoring written text based on use of idiomatic expressions are described. Methods may include reading pre-selected idiomatic expressions in a canonical form into memory, expanding them from the canonical form, reading a written response into the memory, pre-processing the written response, searching the pre-processed written response for idiomatic expressions, and assigning a score to the written response. Score may be based on the number of idiomatic expressions in the written response. Expanding may include adding inflectional variants to idiomatic expressions, or marking an optional element of an idiomatic expression. Idiomatic expressions may include a not fully lexicated idiomatic expression, and expanding may then include pre-filling pronouns in each not fully lexicated idiomatic expression.

The pre-processing may include a tokenization or a sentence-boundary detection. Searching may include matching words of the written response to core components of the idiomatic expressions expanded from the canonical form. Matching may include locating each core component of an idiomatic expression in a non-consecutive order. The pre-selected idiomatic expressions in the canonical form may be obtained from a publicly available list of idioms. The written response may include an argumentative essay written by a non-native English speaker in response to a prompt.

Methods for scoring spoken response based on use of idiomatic expressions are also described. Such methods may include capturing an audio of a spoken response using a microphone, performing automatic speech recognition of the spoken response, reading pre-selected idiomatic expressions in a canonical form into memory, expanding idiomatic expressions from the canonical form, searching the spoken response for idiomatic expressions, and assigning a score to the spoken response. Score may be based on the number of idiomatic expressions in the spoken response.

Systems for scoring written text or spoken response based on use of idiomatic expressions are also described. Such systems may include a memory for storing pre-selected idiomatic expressions in a canonical form, a written response or a spoken response, and a score. Such systems may also include a processor for reading pre-selected idiomatic expressions in the canonical form into memory, expanding idiomatic expressions from the canonical form, reading the written response or the spoken response into the memory, pre-processing the written response or the spoken response, searching the pre-processed written response or the spoken response for idiomatic expressions, assigning the score to the written response or to the spoken response. Score may be based on the number of idiomatic expressions in the written response.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. These technical advantages include lower cost, higher speed, and increased accuracy of review of written responses that includes an assessment of idiomatic expression usage; a wide coverage with an extensible dictionary with thousands of idioms; and flexibility of idiomatic expressions via entry enrichment and skip-steps in the search algorithm.

The estimation of the use of metaphoric and idiomatic expressions in student essays may be utilized as an additional signal of proficiency in English. When done with automatic tools, such estimation may be applicable for practical applications and for large-scale assessment. One potential application is automatic detection of metaphoric and idiomatic expressions in EFL student essays.

We describe not only the quantitative aspects, but also the qualitative aspect of idiom and metaphor use by EFL students. Studies of figurative language in discourse by native speakers of English have shown that it performs important functions, such as agenda management and signaling of attitude, evaluation and appraisal, conveying humor, referring to shared knowledge, and denoting topic change. We describe the functions of idiomatic expressions in argumentative EFL writing, and, more specifically, in the relationship between the use of idioms and the topic of discussion.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE FIGURES

FIG. 1 is an example of automatic expansions from canonical forms of idiomatic expressions.

FIG. 2 is an example of illustrating argumentative prompts from the TOEFL11 corpus.

FIG. 3 is an example of classification categories for the idiom annotation.

FIG. 6 is an example of idiom instances for two canonical idioms.

FIGS. 11A, 11B, and 11C depict example systems for implementing the approaches described herein for automatic detection of idiomatic expressions.

DETAILED DESCRIPTION

Figure 4:
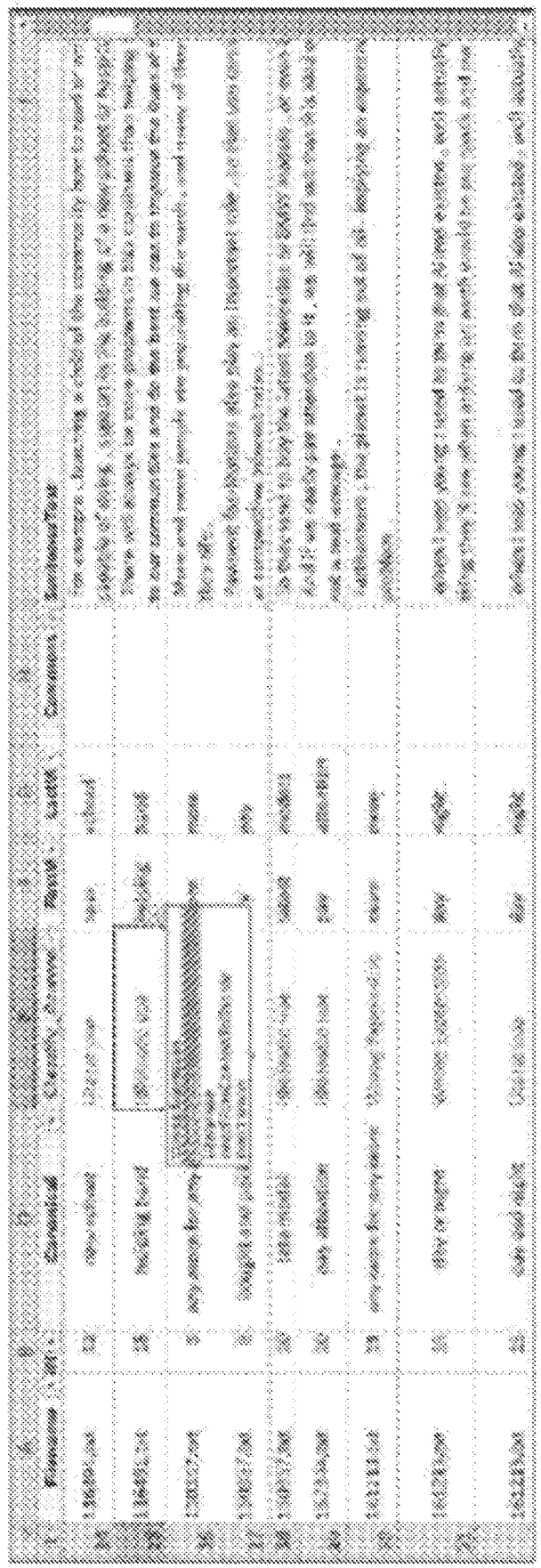
FIG. 4 is an example of a screenshot of idiom annotation environment.

There are two major issues for a theory of idiom comprehension and use. The first issue concerns compositionality, which means to what extent are idioms compositional, that is, to what extent can the meaning of an idiom be derived from the meanings of its constituents. Degree of compositionality varies greatly among idioms, with some idioms being fully compositional and others not at all. The second issue concerns the syntactic properties of idioms, which means to what extent does an idiom's meaning depend on its syntactic form, and to what extent can an idiom be open to syntactic analysis and transformation. Both of these issues have direct relevance to detection of idioms.

Idioms may have flexibility. If an idiom's constituents have no meaning at all, then the idiom should be incapable of syntactic flexibility. However, idioms can vary from being fully syntactically flexible to not at all. Although traditionally idiomatic expression had been considered as "fixed expressions," idioms allow a lot of variation, including adjectival and adverbial modification, quantification, negation, substitution, passivization and topicalization. Flexibility of idiomatic expressions is illustrated using the idiom "don't give up the ship." This expression can appear in a wide range of variations:

a. Tense (inflection): He will give up the ship; He gave up the ship.

b. Passivization: The ship was given up by the city council.

c. Number (inflection): Cowardly? You won't believe it: They gave up all the ships!

d. Adverbial modification: He reluctantly gave up the ship.

e. Adverbial and adjectival modification: After holding out as long as possible, he finally gave up the last ship.

f. Word substitution: Give up the ship? Hell, he gave up the whole fleet.

Many idioms allow for application of various kinds of modifiers, which often insert words and phrases around or even into the core idiomatic phrase. There are linguistic theories and taxonomies for idiom modification. There are also psycholinguistic experiments that demonstrate the flexibility of idiom recognition mechanisms. One very common sub-type of idiomatic expressions includes idioms that are not fully lexically specified. Such idioms, e.g. "be the apple of one's eye," include slots that must be filled in context, thus involving modification and discontinuity of the lexical components of the idiom—posing an additional challenge for automatic detection.

Idioms may be detected automatically. In computational linguistics, idiom detection systems fall in one of two paradigms: phrase (type) classification, where a decision is made whether an expression (out of any context) is always/usually idiomatic or literal, or token classification, where each occurrence of a phrase, in a specific context, can be idiomatic or literal.

When work on idiom detection involved limited sets of expressions, it focused on specific types of syntactic constructions (such as verb+direct object, e.g. stir excitement, or subject+verb, e.g. campaign surged). Detection of non-compositional word combinations focuses on phrase classification (not in context), with limited evaluation sets or specific types of constructions (noun-noun, or verb+direct object).

Idioms may be compiled. An approach to identifying idiomatic expressions in texts is motivated by three factors. One goal may be broad coverage, so as to identify as many different idioms as possible. Second goal may be identifying idiomatic expressions in context, in real-life texts. Third goal may be learner language, including essays written by non-native learners of English. Most of the idioms that might be found in such texts may be well known, stock idioms that may be listed in various dictionaries. An approach to idiom identification may include two phases. In the first phase, a large listing of idiomatic expressions that we want to detect may be compiled. The aim is to identify such expressions in texts, as candidate-idioms, and then apply verification algorithms that would confirm/reject the candidate expressions as being an idiom in the given context. In one embodiment, this may include detecting candidate-idiom expressions in student essays.

The idiomatic expressions may be collected. Publicly available Wiktionary may be used as a resource. English Wiktionary of October 2015 is one example of a Wiktionary. The English Wiktionary has rather broad coverage for idioms, although it is far from being complete. Wiktionary has a facility for contributors to tag definitions as idiomatic. All English expressions that were tagged as idiomatic may be collected. In one example, the initial list may total about 8,000 entries. From that list, several classes of expressions may be eliminated. First, all single word expressions (e.g. backwater) may be eliminated, since we are interested in idiomatic phrases. Next, verb-particle constructions and prepositional verbs (such as whisk away and yell at) may be eliminated. Also, expressions that are common greetings (e.g. good evening) or conventional dialogic expressions (e.g. how do you do) may be eliminated. The resulting list may contain about 5,000 English idiomatic expressions.

An algorithm for detecting idiom-candidate expressions in texts may be based on checking whether any of listed idioms occur in a text. Since idiomatic expressions exhibit considerable flexibility with inflectional and syntactic form variations, a broad-coverage detection algorithm may take such variation into account. This may be achieved by three steps of representation enrichment and one step in algorithmic matching. Initial list of 5,000 expressions (which may be Wiktionary-based) may contain only canonical forms of idioms. Using an in-house morphological toolkit, the representation of an idiom entry may be automatically enriched by including inflectional variants to the idiom's content words. The automatic expansion may be not part-of-speech sensitive. For example "melting pot" may be expanded to "melting/melt/molten/melts/melted/meltings} {pots/pot/potted/potting}."

Next step may be to mark optional elements in the idiom representation. Articles (the, a, an), possessive "'s," commas and hyphens may be marked as optional (an idiom can be matched in a text even if such elements are missing in the text). For example, with inflectional expansion and with marking of optional elements, the idiom "give the royal treatment" may become "{give/given/gave/giving/gives} {the/a/an}^ {royal/royals} {treatment/treatments}." The optionality of articles may stem from the notion that writers, especially EFL writers, might omit articles, or use erroneous ones.

The third step may be the treatment of idioms that are not fully lexicalized, idioms with slots that need to be filled, for example "pour one's heart out" or "knock someone's socks off." Such slots may be pre-fill with a set of pronouns that might occur in such position. For idioms that include a possessive slot, the canonical "someone's" may be substituted with possessive pronouns. For example, "knock someone's socks off" may become "{knocked/knock/knocking/knocks} {my/your/his/her/our/their/one/someone}'s^ {sock/socked/socking/socks} off." For other idioms, the substitution list use nonpossessive pronouns. For example, in canonical expressions like "bite off more than one can chew," "one" may be substituted with "{i/you/he/she/we/they/one/someone/somebody/me/him/her/us/them}."

Reflexive pronouns in canonical idiom forms (e.g. "let oneself go") may be expanded to a set of reflexives "{myself/oneself/yourself/yourselves/himself/herself/itseif/ourselves/themselves}." All automatically added pronouns may be treated as optional elements. Slots may be filled with nonpronominal material (full noun phrases). Some additional examples of automatic expansions are shown in FIG. 1, which depicts idiomatic expressions is canonical form (110) and their expanded forms (120).

The enrichment described above may be performed only once, when the list of canonical idioms is transformed into an enriched search-specification format. Representation enrichment may cater to various elements in the listed idioms. However, idioms may be flexible also in that they may allow insertion of various modifiers over the core components, for example "kick the proverbial bucket," "pay little attention." To detect such variant instances of listed stock idioms, some flexibility to the search algorithm may be provided. The search algorithm may match all the non-optional elements of an idiom, in sequence. The flexibility may be achieved when the algorithm is allowed to match the core components, in order (as specified by the enriched representation), but they may be non-consecutive. The algorithm may skip up to k words between matching elements of an idiom. The value of k may be controlled by the user. In one embodiment, k=4. This approach may allow for detecting idioms that contain unspecified modifiers and intervening insertions.

Note that there may be two separate skip strategies. There may be optional elements in the idiom search-specification, such as determiners or pronouns. This means that not all components of an idiom have to be matched in order to spot a potential idiom-instance. On the other hand, the algorithm may be allowed to skip tokens in the text, to allow for intervening material. The combination of these two approaches may allow to find instances of lexically under-specified idioms with full noun phrase components. For example, the idiom "change one's mind" is expanded to "{changes/changing/change/changed} {my/your/his/her/our/their/one/someone}'s^ {minds/mind/minding/minded}," and the algorithm can identify "changed people's minds" in a text, because the pronouns are optional and "people's" may be skippable.

The approach outlined above may be amenable to a regex implementation. Search system may be built on top of an NLP (natural language processing) toolkit, which may include such pre-processing steps as tokenization and sentence-boundary detection. Thus, the idiom-search specifications may be token-oriented—they may be specified for word-tokens and not for strings in general, as regex is. While the general approach may be implemented with sophisticated regex specification, an implementation on top of a token-aware NLP system may allow for a simpler representation of idiomatic expressions—it may need no wildcards and no regex group-capturing. It also may search for idioms only within sentences (not across sentences). Another advantage is that the underlying NLP system may already handle some noise in the texts, such as omission of spaces after punctuation. Finally, utilization on top of an NLP system may allow for optimizing the search process. For each sentence in each text under consideration, it may be checked whether any of 5,000 enriched expressions is present in the sentence. With a regex-based approach, this would amount to matching against 5,000 regex expressions. The NLP system may allow a faster solution. The enriched dictionary of idioms may be indexed by keywords when it is loaded to memory. Each text may also be indexed, on-the-fly. The indexes may be cross-compared, and the algorithm may attempt to find only those idioms whose keywords appear in the index of the current text.

One limitation of the above approach may be the constraint of sequential matching (even with skips). Some idioms may be flexible enough to allow for passivization or topicalization, variations that invert the word order (especially for idioms involving a verb+direct object, e.g. "the ship was given up by the city council." Method may be extended to handle such cases. The approach outlined above may identify "idiom-candidates," i.e. it may find, in texts, expressions that are likely to be instantiations of stock metaphors. In some embodiments, method may not perform any verification—it may not attempt to confirm that the detected expressions are actually idioms in context.

Any corpus of written text may be used in the methods. In some embodiments, the publicly available TOEFL11 corpus may be used. TOEFL11 consists of essays written for the TOEFL iBT test. The test is used internationally as a measure of academic English proficiency, among other purposes, to inform admissions decisions for students seeking to study at institutions of higher learning where English is the language of instruction. The TOEFL11 corpus contains about 12,000 essays, written in 2006 and 2007, sampled from eight prompts (i.e. eight different discussion topics, see FIG. 2) along with score levels (low/medium/high) for each essay. FIG. 2 shows prompt IDs 210, prompt statements 220, and a number of essays 230 responsive to each of these prompts. In one embodiment, 3,305 essays from this corpus may be sampled, which were selected (1) only among essays that received medium or high score; (2) only essays that had at least a single candidate idiom match, using the most permissive (skip k=4) matching algorithm. Each of the prompts poses a proposition and asks examinees to write an argumentative essay, stating their arguments for or against the proposition. The standard prompt form includes a leading statement and a directive: "Do you agree or disagree with the following statement? [Specific statement here] Use specific reasons and examples to support your answer."

The annotation study may be conducted as part of the method. In one embodiment, about 6,000 expressions were identified as candidate-idiom instances in 3,305 essays. Human annotation may be performed over this entire set of expressions. The following setup may be used for the annotation study. For each candidate-idiom expression, the whole sentence in which that expression occurred was extracted, and all such sentences, may be collected in a spreadsheet file. For each extract, the sentence itself may be provided, what idiom (canonical form) was tentatively detected, and what were the first and last words of the detected phrase. As shown in FIG. 3, for each candidate-expression, the annotator may pick one of the five classification options 310 with descriptions 320. An illustration of the annotation environment is provided in FIG. 4.

All annotation may be performed by a single annotator, a native speaker of American English, contracted through a commercial service. In one embodiment, 6,032 instances may be marked. The annotator may be given an explanation of how the data was processed, and may be encouraged to consult the Wiktionary entries for the canonical stock expressions. Upon completion of the training session, the annotator may be given new expressions from the dataset for evaluation. In one example, the training session contained 100 examples, and a number of new expressions was 300. In this example, the set of 300 items was also annotated by the first author. In this example, exact agreement was found in 285 cases out of 300, which is 95% (Cohen's kappa 0.92).

Figure 5:
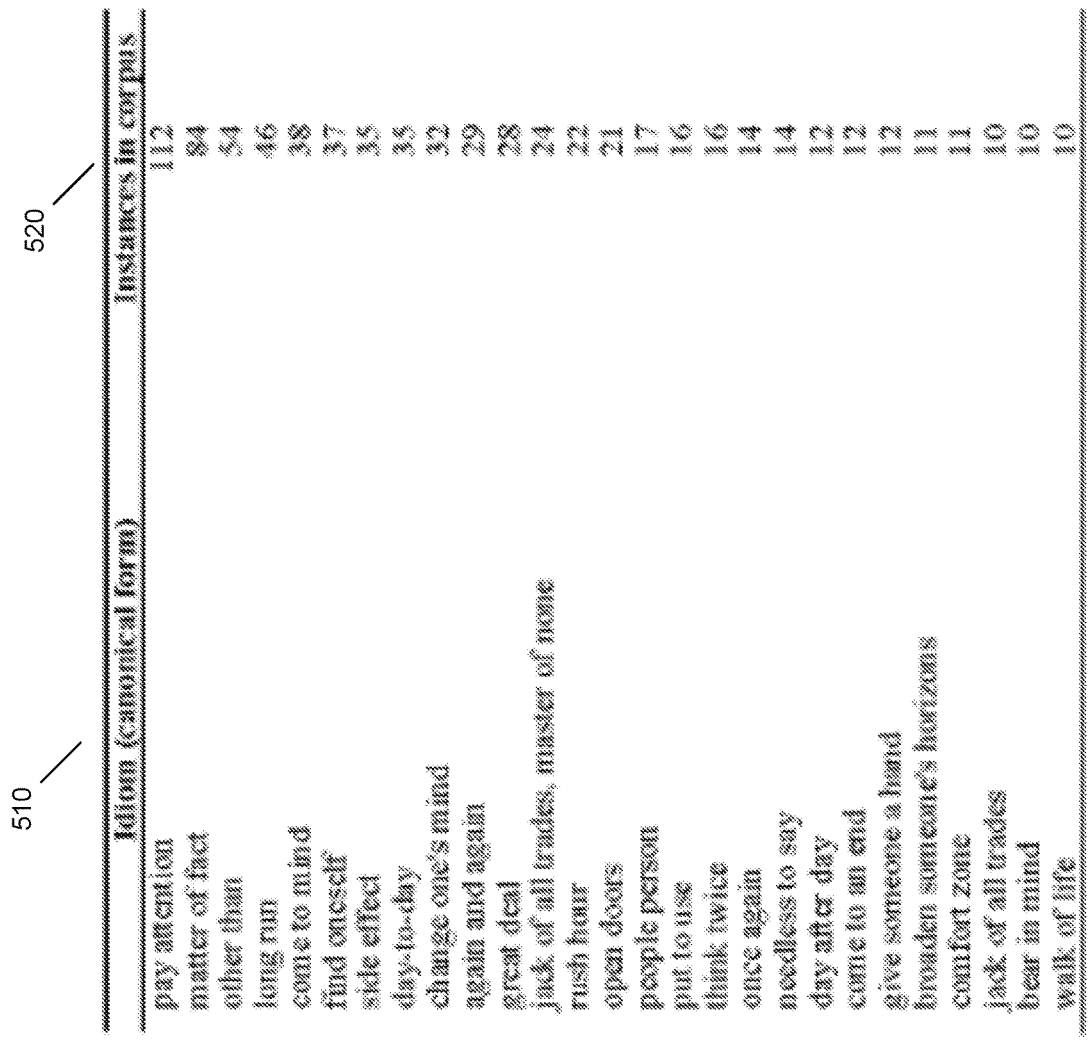
FIG. 5 is an illustration of most frequent idioms found in student essays.

In one example, out of 6,032 expressions marked, the annotation study confirmed 1,315 cases as idiomatic uses. That is precision of 21.8%. Those 1,315 cases belong to 298 different idioms (types or dictionary entries). Thus, out of our 5,076 idioms types, attested instances were found for 298/5,076=5.87%. This can be taken as demonstration that argumentative essays written to TOEFL prompts are quite rich in idiomatic expressions. FIG. 5 lists some of the most common idioms 510 found in the essays, sorted by the number of instances 520 their appear in the corpus. To illustrate the usefulness of the skip-enabled search, FIG. 6 shows some extended forms of two idioms 610 and 620 that were detected in this example.

Figure 7:
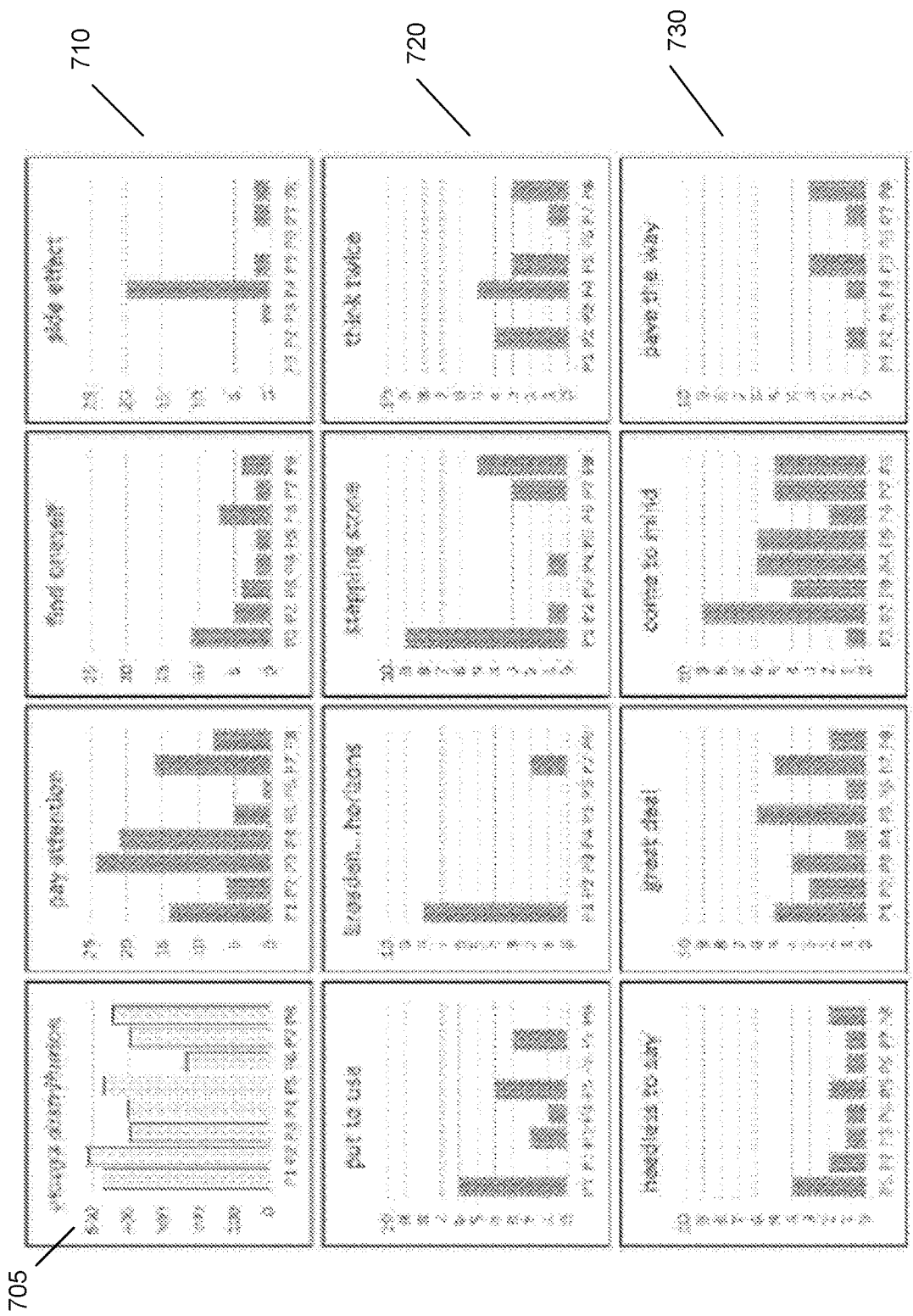
FIG. 7 is an illustration of a list of idioms with preference for certain prompts with p<0.05.

Idiomatic expressions may have a topical distribution, which means that some idioms may show tendency to appear in responses to certain prompt questions and not in others, and some idioms may be more universally attested. Identification of idiomatic expressions in argumentative essays may start with quantifying the dispersion of idioms across the different prompts. For this purpose, an idiom's distribution across the prompts may be considered. For each idiom type (entry), the number of different essays in which it occurred may be counted, per prompt. Since each prompt presents a different topic for argument, the distribution of an idiom across topics of discussion may be considered. Some idioms may be spread more-or-less evenly across prompts, while other idioms may have increased incidence in certain prompts. To check whether the frequency distribution across prompts differs from random sampling, a G-test may be used. This test may checks the likelihood ratio between the observed distribution and a baseline (expected) distribution. Since the samples are quite small, the Williams' correction [may be used, with the baseline distribution proportional to the total number of essays per prompt in the full sample of 3,305 essays. Some of the distributions are illustrated in FIG. 7 which shows eleven idioms and their distribution (by essays) across prompts. Top left 705 is the general distribution of all essays, for comparison (this is the expected distribution for the G-test). Top row 710 includes some of the most frequent idioms, with dear topical preference. Second row 720 includes some less frequent idioms, with dear topical preferences. Third row 730 includes some idioms that do not exhibit clear topical preference in our data.

Figure 8:
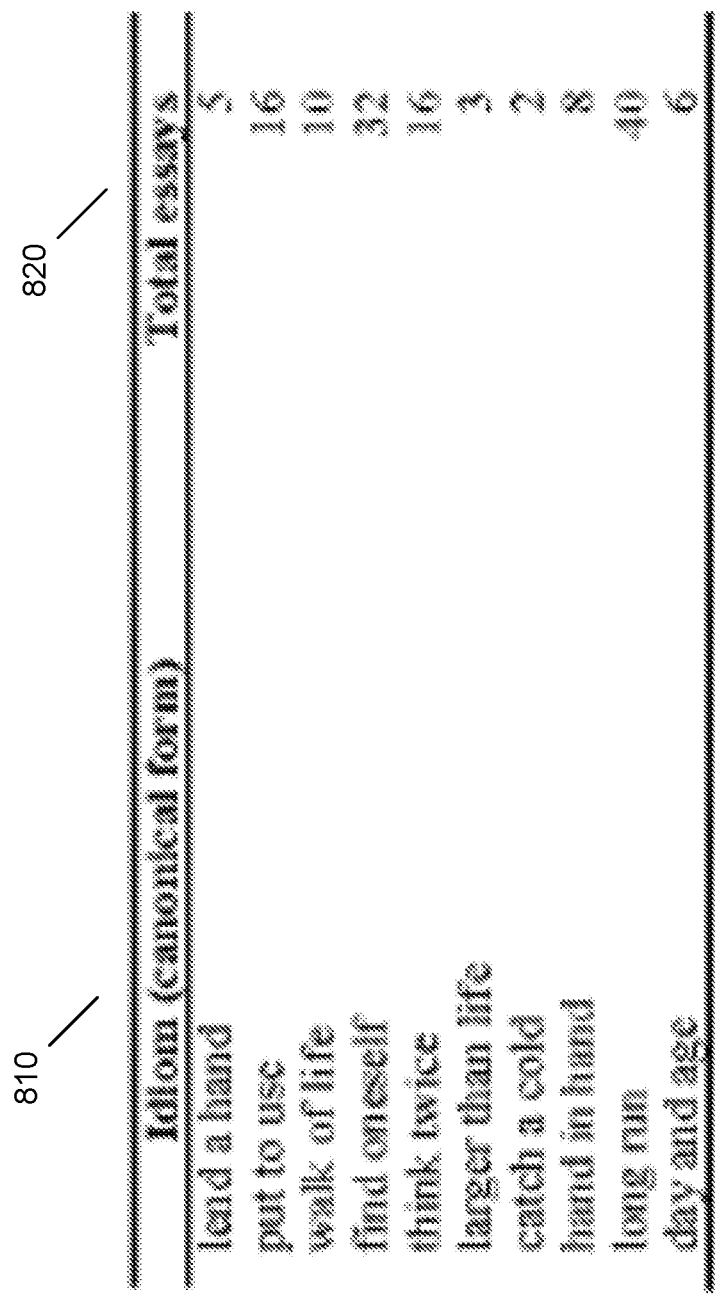
FIG. 8 is an example of eleven idioms and their distribution across prompts.

In one example, out of the 298 idiom types that were found in the corpus, thirty idioms have distributions that significantly differ from random sampling. For ten of them, the significance level was p<0.05. Their canonical forms 810 and number of essays 820 using them are shown in FIG. 8.

Figure 9:
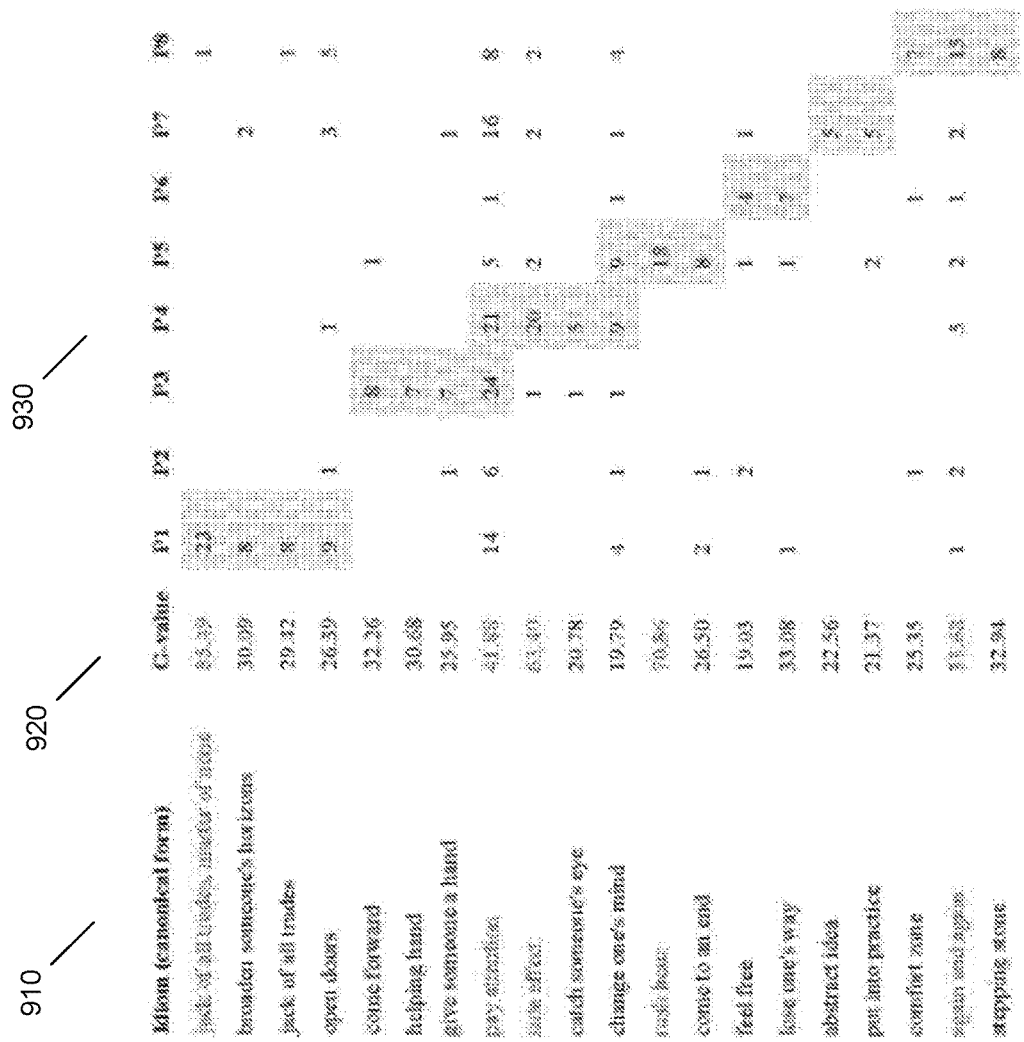
FIG. 9 is an illustration of a list of idioms with preference for certain prompts with p<0.01.

For another twenty idioms, the distribution significantly differs from random with p<0.01. FIG. 9 which shows these idioms in their canonical form 910, corresponding G-value 920, and which prompts 930 they are used for. These idioms are not randomly distributed across topics, with high confidence. Highlights in FIG. 9 show the prompts that garnered a substantially larger number of uses than other prompts. Highlighted font shows the five idioms with the highest G-value, namely, those that have distribution that is most distinct from random distribution across prompts. The most striking result—and the highest G-value—is for "jack of all trades, master of none", that in this example occurred 23 out of the total of 24 instances in the context of P1, the prompt about broad vs specialized knowledge. Similarly, "rush hour" only occurs in the prompt about fewer or more cars in 20 years; "side effect" clearly favors the prompt about advertisements; "again and again" selects the prompt about taking risks for success. Finally, "pay attention" shows two peaks—for the prompt about advertisements and for the prompt about helping one's community.

Several examples of using particular idioms are listed below. Note that those authentic examples involve many errors of English grammar, spelling and usage.

Example: "Jack of all tracks, master of none"

In the context of the prompt "It is better to have broad knowledge of many academic subjects than to specialize in one specific subject", this idiom constitutes an argument for the position that favors specialized knowledge. It says, essentially, that breadth of knowledge comes at the expense of mastery. While "universalist" and "specialist" might be neutral terms on their own, when put in the proverbial rendering above, there is a clear negative framing of the "universalist", since the positively evaluated notion of mastery is completely and entirely excluded from the universalist side (master of none). Thus, the possibility of a competent yet not masterful performance in a specific subject that would be positively evaluated is outside of the frame. Indeed, this framing is evident in the elaboration that many writers provide to the idiomatically expressed argument:

1. In conclusion I strongly feel that being a jack of all trades and master of none diffuses one's talents and prevents one from reaching the highest potential.

2. Excellence in any field can be achieved only when one has specialized in that specific subject and reached its pinnacle . . . . By having a broad knowledge of various academic subjects one can only achieve mediocrity.

3. Trying to have knowledge of all academic studies might overburden the student and it might leave him in disarray and in a chaotic condition . . . . As the saying goes "Jack of all trades master of none"; a student focussed on specific subject will be called a master of specific subject.

4. Therefore, I feel that being perfect in a field helps rather than getting involved into things which you are not very good at. As its rightly said "Jack of all trades, master of none".

5. Most high paying jobs require specialists and not the "Jack of all trades and master of none". Even in the business world one would trust a person who is a seasoned trader rather than a person who is a part trader.

6. I personally believe that being jack of all trades and master of none would never do any good to anyone.

There also are writers who present the idiom as a claim to rebut or to qualify, explicitly negating the aforementioned framing (ex. 7), arguing that one cannot find one's favorite field without some looking around (ex. 8) or that the universalist and the specialist stances are not so much in opposition as describe different stages in the process of education (ex. 9):

7. I would agree with the statement that "it is better to have broad knowledge of many academic subjects than to specialise in one specific subject". I think it is wise to be a "jack of all trades but may be master of none". If one knows sufficient about many subjects but not everything about a particular subject then he might not be able to top any subject but at least he would not fail any of the subjects and if he performs reasonably ok in most then his overall performance would certainly be enhanced.

8. As the popular saying goes "Jack of all trades and is master none". Though the saying indicates that little knowledge in all is not helpful. But in practice like in academics, to find ones area of interest it is essential to get exposed to various subjects. Therefore, the basic knowledge about a variety of areas and in depth knowledge on a subject of primary interest is the right blend for any student.

9. There is a famous English proverb that illustrates the scope of this topic, it reads: "He is a jack of all trades, but a master of none." What this proverb essentially implies is that it is not possible to attain mastery in several fields, one can only specialize in one. The statement of the issue being discussed epitomizes a very paradoxical situation that we as human beings encounter throughout the course of our life, i.e the path of mastery or the path of overall education . . . . Acquiring a broad knowledge of various academic fields is covered at the elementary and sub-secondary levels of education. It is after this stage, that a human being has metamorphosized from this phase of his life into a phase which is ready for mastery, he is in a position to choose.

Quite apart from the specific argumentative burden carried by the idiom, many writers indicate the status of this idiom as a famous, well-known, old, or popular proverb or saying. This by itself constitutes an argument of sorts—an argument from authority, by citing the wisdom of the ages to support one's position.

In the list of topic-specific idioms, the expression "stepping stone" functions similarly to "jack of all trades, master of none". It is nearly always part of the longer expression "Failure is a stepping stone to success", which, in the context of the prompt "Successful people try new things and take risks rather than only doing what they already know how to do well" is an argument for taking risks: Not only is failure something to be tolerated in order to attain success, it is something to be welcomed as a necessary precursor of success.

Example: "Side effect"

The idiom is preferentially used in responses to the prompt "Most advertisements make products seem much better than they really are". In their responses, writers often relate circumstances in which advertisements did as the statement contends, then go on to discuss whether this is a bad or an acceptable practice. In this context, the idiom side effect is most typically used to give an example of a danger in not telling the customers about negative aspects of a product in a sufficiently clear fashion, especially in the medical context. It serves to show an extreme case where the embellishment practice has strong negative consequences. While most writers use this example to damn the advertisement practice of making the product appear better than it is, some writers use the idiom to argue that there is regulation in the advertisement industry against omissions that would be dangerous to the customers—advertisements do in fact mention side effects, so embellishments, if any, are typically restricted to innocuous issues. Most writers are aware of the negative connotation of side effect (ex. 10-11), but in some cases writers seems to use it as a neutral term that requires a qualification with "negative" (ex. 12).

10. Most advertisements appeal an advantages of the products, hiding a disadvantages. Let's think about the advertisements of a medicines. Most of them highlighted the effect of the products not even suggesting the side-effect of the products.

11. Dramatic pictures shown on television or printed in magazines display its unique ability to thicken thicken, but never mention that this same technology also leads to a clumping or, worse, shedding of eyelashes. If the companies mentioned these side-effects who would buy this revolutionary mascara?

12. But what makes this Red Bull is the most famous energy drink, is the advertisements and campaigns all over the world showing its one side effect (Energy) hiding all other negative side effects that might cause our lives especially our youth!

There was also a metaphorical (or, rather, doubly metaphorical) use of side effect to describe the relationship between product embellishment and advertisement in general, in a rare defense of the advertisement industry (ex. 13):

13. I agree with this statement and I also believe that it's an unavoidable "side effect" of the advertising process. In an advertisement every single aspect is carefully and strategically planned to attract the attention of an audience and to convince it. It's not a surprise then if in an advertisement a product looks so good and when we have it in our hands it doesn't meet our expectations.

Example: "Rush hour"

This idiom is used exclusively in responses to the prompt "In twenty years, there will be fewer cars in use than there are today." Rush hour denotes a situation where many people commute to or from work at the same time; the connotation, however, is that of a particularly unpleasant traffic situation. Consequently, test-takers use rush hour to point to a problem with too many cars. Rush hour traffic presents an environmental problem (extensive pollution) and/or a utility problem (cars are useless in cities, traffic is so bad it's a waste of time). People who use this point to argue that there will be fewer cars in the future tend to say that people will make more use of public transportation in the future, that would help with both the environmental and the efficiency problems. People who argue that there will be more cars in the future still use rush hour to point to a problem with too many cars, but use it as a concession point—proliferation of cars is a problem, but there are still going to be more cars because (a) the advantages of having a private car outweigh the disadvantages, even if one is moving very slowly in rush hour traffic; (b) the problem will be solved by improving the design of cars in the future; (c) the public transportation alternative as currently implemented is not good enough; (d) people like convenience and luxury. Thus, while not constituting a complete argument in itself (as in the case of "jack of all trades, master of none"), the expression has a consistent argumentative use similar to that of side effect, namely, pointing out a problem.

Example: "Pay attention"

This idiom is more ubiquitous than the others considered so far, and it occurs across multiple prompts. Still, it is substantially more frequent in prompts P3 ("Young people nowadays do not give enough time to helping their communities") and P4 ("most advertisements make products seem much better than they really are"). Pay attention has a positive connotation and suggests that the object of the attention is a worthwhile/beneficial investment of one's resources, as well as connoting expenditure, namely, paying attention leaves you with less attention to spare for other potential objects of attention. In both the topics, there is a central theme of a making an effort to attend to something worthwhile in the face of distraction.

In the advertisement context, people need to pay attention to important information about the product in spite of a deliberate obfuscation of such information in advertisement when it reflects negatively on the product. Writers note that advertisements are made to attract the customer's attention (ex. 14-15), and many are arguing that customers should deliberately redirect their attention from the main point of the advertisement to other, more important things, such as the cost of the product, or small details of the product's description, to regulating the advertising industry, and simply to keep from being misled by the advertisement (ex. 16-21).

14. I feel this is right because the advertisements are made to let the consumers pay strongly attention to the products.

15. The advertisement has to be original, . . . , colorful to involve people to pay attention to it and to the product.

16. However, as a consumer, we really need to pay attention to the money we spend and do not get fooled by the advertisement.

17. It has to be in the end of the advertisement so no one can pay attention.

18. On the other hands, there were small explanation about toy "it may change form image" however almost people do not pay attention so much detail.

19. We should pay attention when we decide to buy it or not, and do not just believe the advertisement.

20. We should pay more attention on the controls that the government should do when allow advertisement to do damns.

21. Advertisements always have their effect on you if you did not pay attention for yourself. Do not buy the product without making sure that you got the right product.

In the context of giving help to communities, pay attention is typically used to say that young people are not dedicating enough of their physical and mental resources to community service—their attention is diverted to other things, such as schoolwork and individual achievement; movies and girls; entertainment, games, and the virtual world; self-care and self-indulging; silly things (ex. 22-29). The implication is that those other things are less worthy of attention, that they are getting more than their reasonable share of attention; thus, even when the author says that it is understandable that attention is directed towards self-fulfillment in a more individualistic society, this is usually not presented in a positive light. A small proportion of writers maintain that young people do succeed in managing their attention so that they deal both with community and with other things (ex. 30), or qualify that young people do pay attention in emergency situations (ex. 31).

22. In my limited experience, it is quite true that more and more younsers neglect their own communities and pay scarce time and attention on helping their communities . . . more youngsters are taught to study harder and focus on their schoolwork, and this may make them more self-centered because teachers and even their parents require them to pursue their own accomplishment or higher grades in every contest.

23. Young people nowadays pay too much attention on their studies.

24. Secondly their parents should encourage them to be more involved and not to pay a lot of that attention to movies or girls that attention should be directed in a more useful way.

25. Moreover, I can say that there are many silly things which pay the attention of many youngs in the world, such as: movies, some magazines, some websites on the internet and some songs.

26. They have to study and work all day long an even during weakens, so they can not pay attention to their communities.

27. I think it is an excuse that young people don't have enough time to help, because they spend too much time not only in studying but also in playing and they don't pay attention to the environment they live in.

28. So, we can see that community's significance has decreased, it could be accounted to the industrialization which made people's life more individualized, paying more attention towards money than the rest with no time for community.

29. Consequently, helping one's community is not a thing young people pay particular attention to, because they are overly concerned with much more "important" issues.

30. First, they would pay close attention to society where they belong to, even though there are a lot of burdens they have to deal with by themselves.

31. I do not agree with the statement that the young people nowadays do not pay much attention to helping their communities. In times of urgent need they young people are always on the forefront in helping others.

Example: "Again and again"

While this expression occurs across multiple prompts, it is used especially frequently in essays responding to P8: "Successful people try new things and take risks rather than only doing what they already know how to do well." Inspecting the occurrence of again and again, we observe two types of uses: (1) in the context of doing the same thing again and again, which has a negative evaluation and connotes routine, boredom, stagnation; (2) in the context of trying again and again, which has a positive evaluation and connotes persistence in face of failure, belief in oneself, tenacity. Both types of usages argue for innovation and against routine. Examples 32-35 show the first usage; examples 36-40 show the second.

32. For example, scientists who come up with new innovations in this present world are very imaginative in inventing new things rather than working on the same thing again and again.

33. Doing the same thing or the thing which already know is like doing or repeating the same thing again and again.

34. If we do some thing for a long time than we would already improve that skills and we would get bore of doing one thing again and again.

35. Otherwise life will be boring, pale and we will be machines doing the same stuff again and again.

36. However, if we try again and again, success will come back to us.

37. I will try again and again for my dream.

38. Keep something in the mind that lots of experiments that the scientists did, they already had mistakes with it but they tried it again and again.

39. It took them loads of restless work and patience and the ability to cope with failure again and again to give what we relish or enjoy in today's world a telephone or a steam engine.

40. When we learn new things, we need a lot of knowledge, information, and results of tests. It will take a long time. I respect Mendel, who identified the existence of DNA in 19th century. He tried mating peas again and again.

There are two cases of mixing the two usages. In 41, trying is used synonymously with using, not in the sense of trying that implies risk, and the overall expression clearly has a negative evaluation that goes with repeating the same thing again and again, even though we already know it does not work for the particular patient In 42, the usage seems somewhat confusing—the writer is clearly going after the positively evaluated try again and again, but it is not clear why trying the same thing again and again would yield different outcomes across the different trials. Indeed, the more typical usage of try again and again implies that it is not the exact same thing that is being attempted every time, but some close variant that has not been tried yet and so has a chance of success (see example 40), or, even more generally, that one is trying to solve the same problem or achieve the same goal with perseverance, but there is no implication that the actual methods are similar across attempts (see example 37).

41. For example: if a patient has a cancer and he is taking appropriate medications but the symptoms of cancer are n't working with the use of medicines then it is better for a doctor to try chemotherapy ie use UV rays which are very hard to tolerate but has high chances of subsiding the growth of cancer cells rather than trying the same medication again and again for better and longer living of person.

42. If successful people tried new things and they failed, they wouldn't be discouraged and they would try the same thing again and again, until they succeed.

Based on the discussion above, it seems that the expression again and again lacks a strong semantic prosody, namely, a tendency to occur consistently with a positive or a negative evaluative context. It does acquire strong semantic prosody when extended to either same thing again and again or try again and again.

The "topical" behavior of certain idioms, namely, their preferential use when presenting arguments on certain topics rather than others, may be not merely an issue of belonging to a certain semantic field that is expected to be touched upon when discussing a particular topic. "Topical" idioms in argumentative discourse tend to play an important role in the argumentation itself.

This role could be as large as stating a position in the controversy and providing an argument for that position—so much so that the entirety of the essay can be seen as an elaboration of the idiom. This was the case for "jack of all trades. master of none" in the context of the debate around the importance of broad vs specialized knowledge, as well as for "stepping stone", which was part of "failure is a stepping stone to success", in the context of an argument around the trade-off between trying out new things and doing what one already knows how to do well. In these cases, not only do the idioms nicely encapsulate the argument, they also provide an added value of an argument from authority, by quoting form the wisdom of the ages.

In some cases, the evaluative nature of idiomatic expressions may make them useful as examples with a clear evaluative purport, such as "side effect" in the context the discussion around whether advertisements make products seem better than they are, and "rush hour" in the context of whether there are going to be more or fewer cars 20 years from now. In the first case, "side effect" may bring up a strongly negative connotation of an adverse effect of a drug that could endanger a patient's health or even life. In the second case, "rush hour" may be a strongly unpleasant traffic condition that arises with extensive use of cars. Furthermore, the mere fact that the example has a special, idiomatic name that is nonetheless very familiar may lend an added value of citing a typical example, as opposed to an obscure one that one would have had to set up with many words and qualifications. Thus, "rush hour" is a rather common traffic related problem (compare to "a case where a truck spills oil which makes a slippery ride for the cars following the truck"), and "side effect" may be a rather common problem with products that positively affect one aspect of our well-being while inadvertently hurting another.

The evaluative nature and the rich connotations of an idiom may be also explored for the purposes of a contrastive argument, by helping to set up a non-trivial contrast efficiently. Thus, "pay attention" may be used to discuss the contrast between things that are worthy of a person's investment of his or her physical and mental resources and those that are not, especially in cases where the proper direction of attention requires special effort—the non-trivial setup of the contrast may be neatly packaged in the two words of the idiom.

Thus, advertisements draw attention to positive aspects of a product, yet one is advised to consider other aspects that are often de-emphasized, such as cost, quality, or adverse effects. In the context of volunteering in the community, individual achievement and pervasive entertainment both divert one's attention away from the people around you, the community.

There may be a case where the idiomatic expression had to be extended to include some of its common collocates in order to appreciate its alignment with the argument. Namely, "again and again" may be used either as doing the same thing again and again or as trying again and again, with diametrically opposite evaluation. In the context of a discussion about whether successful people take risks, the two expressions paint risk taking as determination (trying again and again), lending it a positive evaluation, and doing what you are good at as boring and ineffective (doing the same thing again and again), lending it a negative evaluation.

The strong evaluative element, the rich set of connotations, and even the mere fact of being a common wisdom or a special coinage all may make idioms useful for making effective arguments. Topical idioms, namely, idioms that are particularly frequent in a given topic of discussion, are likely to be particularly apt for helping writers with their arguments—from helping to set up complex ideas with few words, through providing effective examples, all the way to encapsulating both one's position in a controversy and its main supporting argument.

A computational procedure for automatic detection of idiom-candidate phrases in essay texts was described. The procedure was developed to address multiple constraints—provide wide coverage (with an extensible dictionary with thousands of idioms) and address the flexibility of idiomatic expressions (via entry enrichment and skip-steps in the search algorithm).

An annotation study helped to focus on the verified idiomatic expressions in essays. With that data, the distribution of various idioms across eight different argumentative topics was compared. Analysis of distributions revealed that some idioms have clear non-random topical preferences. Analysis of select topical idioms from data has shown that idioms may be used not just in a topic-relevant manner, but they may convey clear evaluative and argumentative connotations.

As many of the idioms contain metaphorical elements, argumentative roles of metaphors may be relevant, the first among them may be serving as framing devices that select and highlight some facets of events or issues, and making connections among them in order to promote a particular interpretation, evaluation, or solution. Indeed, an idiom like "jack of all trades, master of none" may impose a frame that discourages consideration of good performance that is short of mastery in positive terms, for example.

Non-native users of English are capable of making sophisticated uses of idiosyncratic English, even though their command of English grammar, phraseology, and morphology is often far from perfect. That this is a non-trivial achievement is further highlighted by a few cases where the use of the idiom was confusing or possibly not quite right in terms of exploiting the idiom's connotations.

Figure 10:
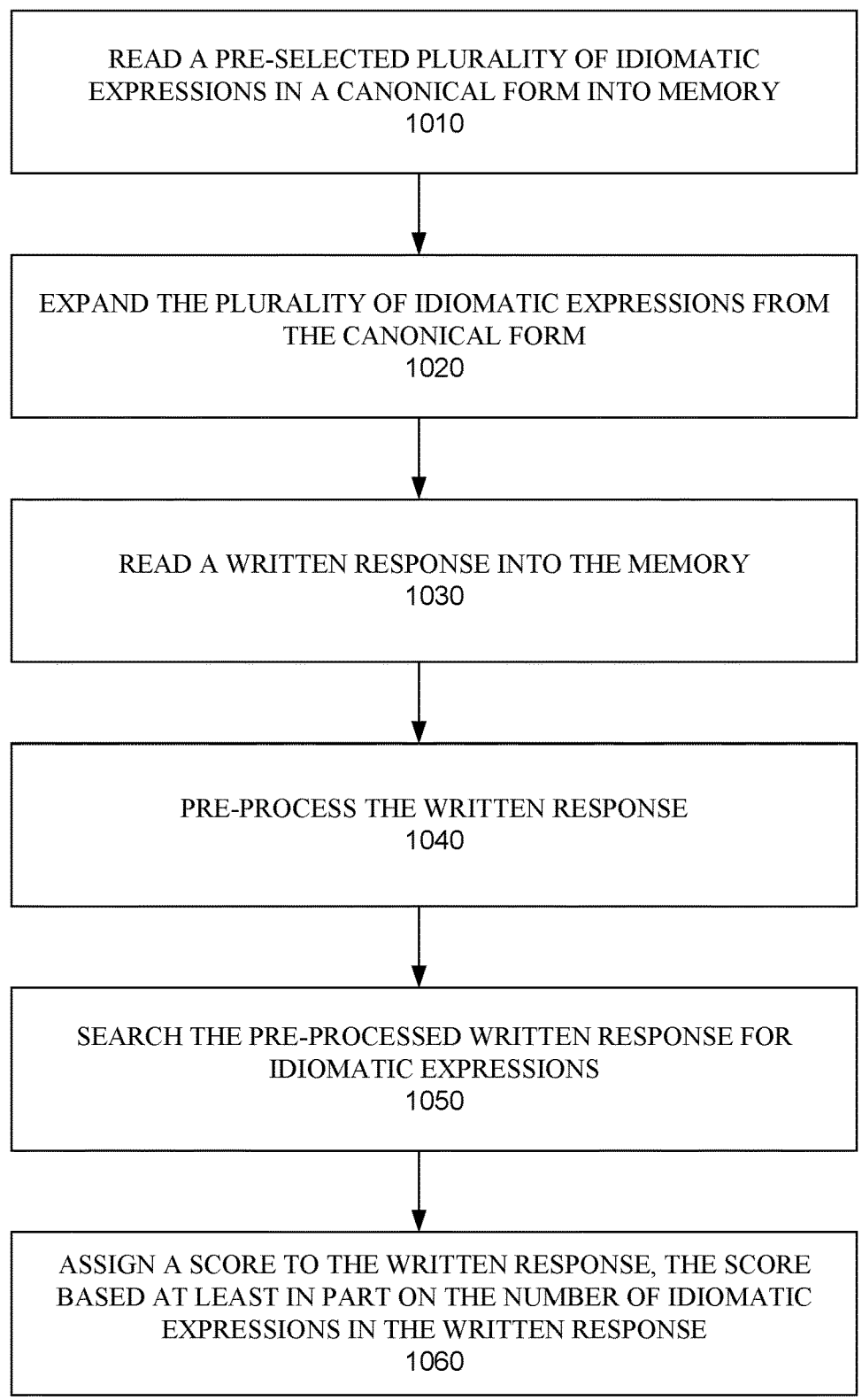
FIG. 10 is a diagram illustrating an exemplary method according to an embodiment.

FIG. 10 shows a method according to one embodiment. It includes reading a pre-selected plurality of idiomatic expressions in a canonical form into memory 1010; expanding the plurality of idiomatic expressions from the canonical form 1020; reading a written response into the memory 1030; pre-processing the written response 1040; searching the pre-processed written response for idiomatic expressions 1050; and assigning a score to the written response, the score based at least in part on the number of idiomatic expressions in the written response 1060.

Systems and methods described herein may be also applicable to automatic detection of idiomatic expressions in spoken speech. In such configuration, some pre-processing of spoken responses may be required. A microphone may be used to capture a spoken response. A spoken response may be a response to a prompt, or a part of a conversation, or an argumentative speech. Automatic speech recognition may be used to convert captured audio of spoken responses into digital files. Digitized speech files may be compared to a list of idiomatic expressions, which may include both canonical forms and expanded forms of idiomatic expressions. Preparation of the list of idiomatic expressions for scoring spoken responses may be the same or similar to a preparation of the list of idiomatic expressions for scoring written responses. Based on a comparison of a list of idiomatic expressions to digitized speech files, original spoken responses may be scored. The scoring may include a number of different idiomatic expressions used, a frequency of use of each idiomatic expression, how close the used idiomatic expression is to its canonical form, and how relevant the used idiomatic expression is to the prompt that elicited the spoken response.

Figure 11C:
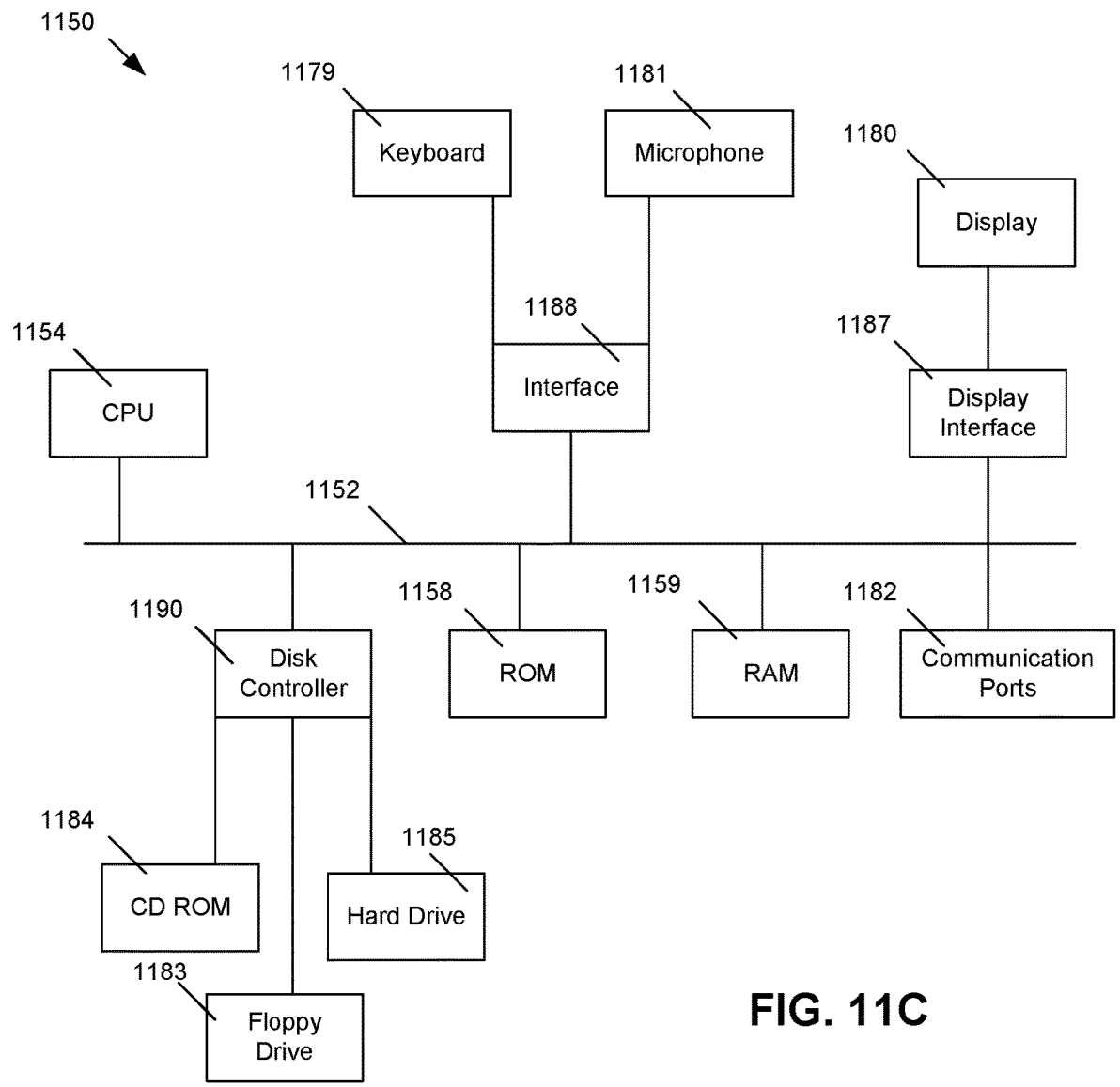

FIGS. 11A, 11B, and 11C depict example systems for implementing the approaches described herein for automatically scoring written responses based on the use of idiomatic expressions. For example, FIG. 11A depicts an exemplary system 1100 that includes a standalone computer architecture where a processing system 1102 (e.g., one or more computer processors located in a given computer or in multiple computers that may be separate and distinct from one another) includes a computer-implemented digital recording 1104 being executed on the processing system 1102. The processing system 1102 has access to a computer-readable memory 1107 in addition to one or more data stores 1108. The one or more data stores 1108 may include existing exam units 1110 as well as previously generated speaking tasks 1112. The processing system 1102 may be a distributed parallel computing environment, which may be used to handle very large-scale data sets.

FIG. 11B depicts a system 1120 that includes a client-server architecture. One or more user PCs 1122 access one or more servers 1124 running an appropriate-level digital recording 1137 on a processing system 1127 via one or more networks 1128. The one or more servers 1124 may access a computer-readable memory 1130 as well as one or more data stores 1132. The one or more data stores 1132 may include existing exam units 1134 as well as previously generated speaking tasks 1138.

FIG. 11C shows a block diagram of exemplary hardware for a standalone computer architecture 1150, such as the architecture depicted in FIG. 11A that may be used to include and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors at a given computer or at multiple computers), may perform calculations and logic operations required to execute a program. A non-transitory processor-readable storage medium, such as read only memory (ROM) 1158 and random access memory (RAM) 1159, may be in communication with the processing system 1154 and may include one or more programming instructions for performing the method of automatically generating texts appropriate for a reading level of an individual. Optionally, program instructions may be stored on a non-transitory computer-readable storage medium such as a magnetic disk, optical disk, recordable memory device, flash memory, or other physical storage medium.

In FIGS. 11A, 11B, and 11C, computer readable memories 1107, 1130, 1158, 1159 or data stores 1108, 1132, 1183, 1184, 1188 may include one or more data structures for storing and associating various data used in the example systems for automatically generating texts appropriate for a reading level of an individual. For example, a data structure stored in any of the aforementioned locations may be used to store data from XML files, initial parameters, and/or data for other variables described herein. A disk controller 1190 interfaces one or more optional disk drives to the system bus 1152. These disk drives may be external or internal floppy disk drives such as 1183, external or internal CD-ROM, CD-R, CD-RW or DVD drives such as 1184, or external or internal hard drives 1185. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1190, the ROM 1158 and/or the RAM 1159. The processor 1154 may access one or more components as required.

A display interface 1187 may permit information from the bus 1152 to be displayed on a display 1180 in audio, graphic, or alphanumeric format. Communication with external devices may optionally occur using various communication ports 1182.

In addition to these computer-type components, the hardware may also include data input devices, such as a keyboard 1179, or other input device 1181, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A processor implemented method for scoring written text based on use of idiomatic expressions, the method comprising:
    reading a pre-selected plurality of idiomatic expressions in a canonical form into memory;
    expanding the plurality of idiomatic expressions from the canonical form;
    reading a written response into the memory;
    pre-processing the written response;
    searching the pre-processed written response for idiomatic expressions; and
    assigning a score to the written response, the score based at least in part on the number of idiomatic expressions in the written response,
    wherein the expanding comprises adding inflectional variants to at least one of the plurality of idiomatic expressions.

2. The method of claim 1, wherein the expanding further comprises marking an optional element of at least one of the plurality of idiomatic expressions.

3. The method of claim 2, wherein the plurality of idiomatic expressions comprises at least one not fully lexicated idiomatic expression, and wherein expanding further comprises pre-filling pronouns in each not fully lexicated idiomatic expression.

4. The method of claim 1, wherein the pre-processing comprises a tokenization.

5. The method of claim 4, wherein the pre-processing further comprises a sentence-boundary detection.

6. The method of claim 1, wherein the searching comprises matching words of the written response to core components of the plurality of idiomatic expressions expanded from the canonical form.

7. The method of claim 6, wherein the matching comprises locating each core component of at least one of the plurality of idiomatic expressions in a non-consecutive order.

8. The method of claim 1, wherein the pre-selected plurality of idiomatic expressions in the canonical form is obtained from a publicly available list of idioms.

9. The method of claim 1, wherein the written response comprises an argumentative essay written by a non-native English speaker in response to a prompt.

10. A system for scoring written text based on use of idiomatic expressions, comprising:
   a memory for storing a pre-selected plurality of idiomatic expressions in a canonical form, a written response, and a score; and
   a processor for:
      reading the pre-selected plurality of idiomatic expressions in the canonical form into memory;
      expanding the plurality of idiomatic expressions from the canonical form;
      reading the written response into the memory;
      pre-processing the written response;
      searching the pre-processed written response for idiomatic expressions; and
      assigning the score to the written response, the score based at least in part on the number of idiomatic expressions in the written response,
      wherein the expanding comprises adding inflectional variants to at least one of the plurality of idiomatic expressions.

11. The system of claim 10, wherein the expanding further comprises marking an optional element of at least one of the plurality of idiomatic expressions.

12. The system of claim 11, wherein the plurality of idiomatic expressions comprises at least one not fully lexicated idiomatic expression, and wherein expanding further comprises pre-filling pronouns in each not fully lexicated idiomatic expression.

13. The system of claim 10, wherein the pre-processing comprises a tokenization and a sentence-boundary detection.

14. The system of claim 10, wherein the searching comprises matching words of the written response to core components of the plurality of idiomatic expressions expanded from the canonical form.

15. The system of claim 14, wherein the matching comprises locating each core component of at least one of the plurality of idiomatic expressions in a non-consecutive order.

16. The system of claim 10, wherein the pre-selected plurality of idiomatic expressions in the canonical form is obtained from a publicly available list of idioms.

17. The system of claim 10, wherein the written response comprises an argumentative essay written by a non-native English speaker in response to a prompt.

18. A processor implemented method for scoring spoken response based on use of idiomatic expressions, the method comprising:
   capturing, with a microphone, an audio of a spoken response;
   performing automatic speech recognition of the spoken response;
   reading a pre-selected plurality of idiomatic expressions in a canonical form into memory;
   expanding the plurality of idiomatic expressions from the canonical form;
   searching the spoken response for idiomatic expressions; and
   assigning a score to the spoken response, the score based at least in part on the number of idiomatic expressions in the spoken response;
   wherein the expanding comprises adding inflectional variants to at least one of the plurality of idiomatic expressions.

* * * * *